(12) United States Patent
Hsu et al.

(10) Patent No.: US 11,788,569 B2
(45) Date of Patent: Oct. 17, 2023

(54) ANTI-PULLOUT AND LOW-RESISTANCE SCREW

(71) Applicants: Kuo-Tai Hsu, Tainan (TW); Ming-Hao Hsu, Tainan (TW)

(72) Inventors: Kuo-Tai Hsu, Tainan (TW); Ming-Hao Hsu, Tainan (TW)

(*) Notice: Subject to any disclaimer, the term of this patent is extended or adjusted under 35 U.S.C. 154(b) by 199 days.

(21) Appl. No.: 17/109,272

(22) Filed: Dec. 2, 2020

(65) Prior Publication Data

US 2022/0099130 A1 Mar. 31, 2022

(30) Foreign Application Priority Data

Sep. 26, 2020 (TW) .................................. 109133451

(51) Int. Cl.
*F16B 35/04* (2006.01)
*F16B 25/00* (2006.01)

(52) U.S. Cl.
CPC ...... *F16B 25/0057* (2013.01); *F16B 25/0047* (2013.01); *F16B 25/0073* (2013.01)

(58) Field of Classification Search
CPC .............. F16B 25/0073; F16B 25/0047; F16B 25/0068; F16B 25/0057
USPC .................................................. 411/411, 412
See application file for complete search history.

(56) References Cited

U.S. PATENT DOCUMENTS

| | | | | |
|---|---|---|---|---|
| 4,652,194 A * | 3/1987 | Tajima | ............... | F16B 25/0052 411/386 |
| 5,294,227 A * | 3/1994 | Forster | ............... | F16B 25/0084 411/386 |
| 5,569,009 A * | 10/1996 | Suzuki | ..................... | F16B 39/30 411/413 |
| 5,957,646 A * | 9/1999 | Giannuzzi | ........... | F16B 25/0068 411/311 |
| 7,704,030 B2 * | 4/2010 | Chen | .................. | F16B 25/0015 411/386 |
| 7,862,279 B2 * | 1/2011 | Stiebitz | ................. | F16B 35/041 411/387.1 |
| 8,182,186 B2 * | 5/2012 | Huber | ................. | F16B 25/0026 411/386 |
| 8,382,811 B2 * | 2/2013 | Crook | ............... | A61B 17/7032 606/305 |
| 10,480,560 B2 | 11/2019 | Eckert et al. | | |
| 10,859,107 B2 * | 12/2020 | Eckert | ................. | F16B 25/0015 |
| 2007/0297871 A1 * | 12/2007 | Lu | ....................... | F16B 25/0052 411/413 |

(Continued)

*Primary Examiner* — Gary W Estremsky (57) ABSTRACT

An anti-pullout and low-resistance screw includes a shank, a screw-in portion, a head portion, and a thread. The thread is helically formed around both the screw-in portion and the shank and includes a plurality of thread convolutions. Each thread convolution includes an upper tooth surface facing the head portion and a lower tooth surface facing the screw-in portion. At least one tapered pressing structure is designed on the screw-in portion and/or the shank to define at least one section with its outer diameter tapering towards the screw-in portion gradually. The tapered pressing structure extends from a bottom edge of the lower tooth surface along a longitudinal axis of the shank. The lower tooth surface has a lower tooth surface height that is greater than the thread height. An annular anti-pullout plane is formed on the shank between two adjacent thread convolutions to enhance the anti-pullout strength of the screw.

6 Claims, 10 Drawing Sheets

(56) References Cited

U.S. PATENT DOCUMENTS

| | | | |
|---|---|---|---|
| 2010/0196121 A1* | 8/2010 | Karupaya | B21H 3/06 |
| | | | 470/84 |
| 2012/0034048 A1* | 2/2012 | Karupaya | F16B 25/0015 |
| | | | 72/469 |
| 2014/0023457 A1* | 1/2014 | Gaudron | F16B 25/0078 |
| | | | 411/424 |
| 2018/0106287 A1 | 4/2018 | Eckert et al. | |

* cited by examiner

ANTI-PULLOUT AND LOW-RESISTANCE SCREW

BACKGROUND OF THE INVENTION

1. Field of the Invention

The present invention relates to a screw and, more particularly, to an anti-pullout screw with low driving resistance.

2. Description of the Related Art

A traditional wood screw includes a shank, a pointed screw-in portion formed at the front section of the shank, and a thread formed on the screw-in portion and the shank. With the thread screwed into two workpieces, the workpieces linked by the screw can join together. For workpieces with distinct sizes, individual wood screws with various dimensions have been manufactured. However, when the shank has a large shank diameter, there swill be considerable screw-in resistance during the process of bringing the connected thick shank into the workpiece by the screw-in portion which relies solely on the wedge effect of the thread, causing laborious operation and consuming a lot of power.

Figure 1:
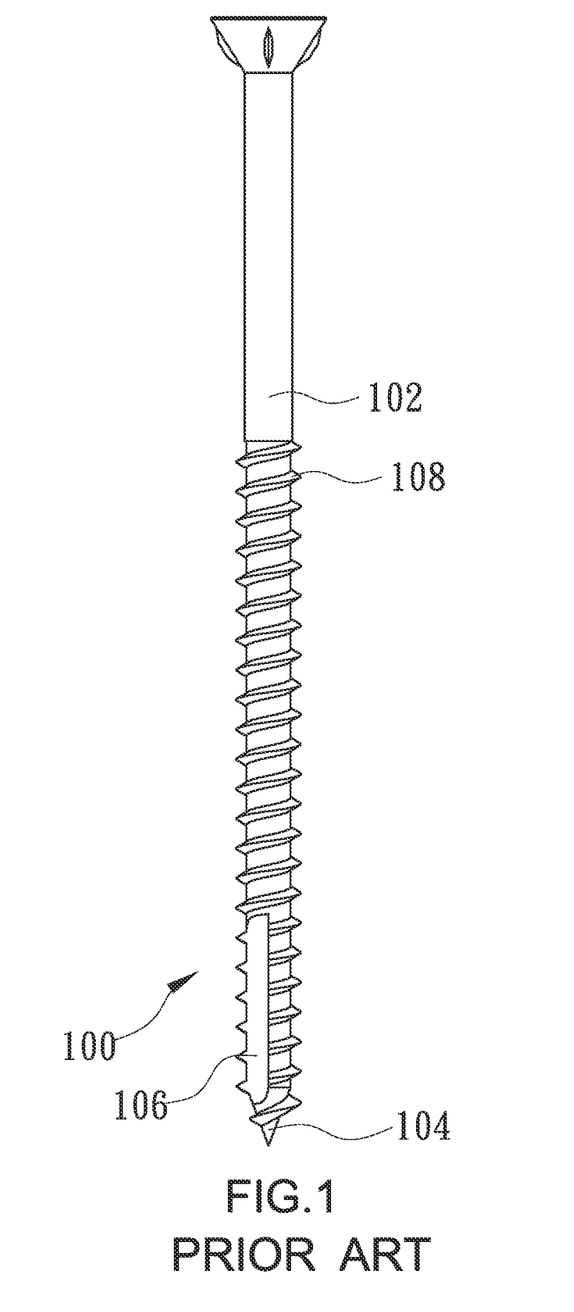
FIG. 1 is a schematic view of a traditional wood screw.

To improve the above problems, a wood screw 100, as shown in FIG. 1, is provided with a notch 106 on which a cutting plane is formed. When a screw-in portion 104 of the wood screw 100 is screwed into a workpiece, the cutting plane of the notch 106 can destroy the workpiece to assist a thread 108 of the wood screw 100 to bite into the workpiece. However, the notch 106, which can contribute to driving the wood screw 100 into the workpiece in the beginning, is full of debris later and fails in helpfully screwing the shank 102 with a larger shank diameter into the workpiece.

Figure 2:
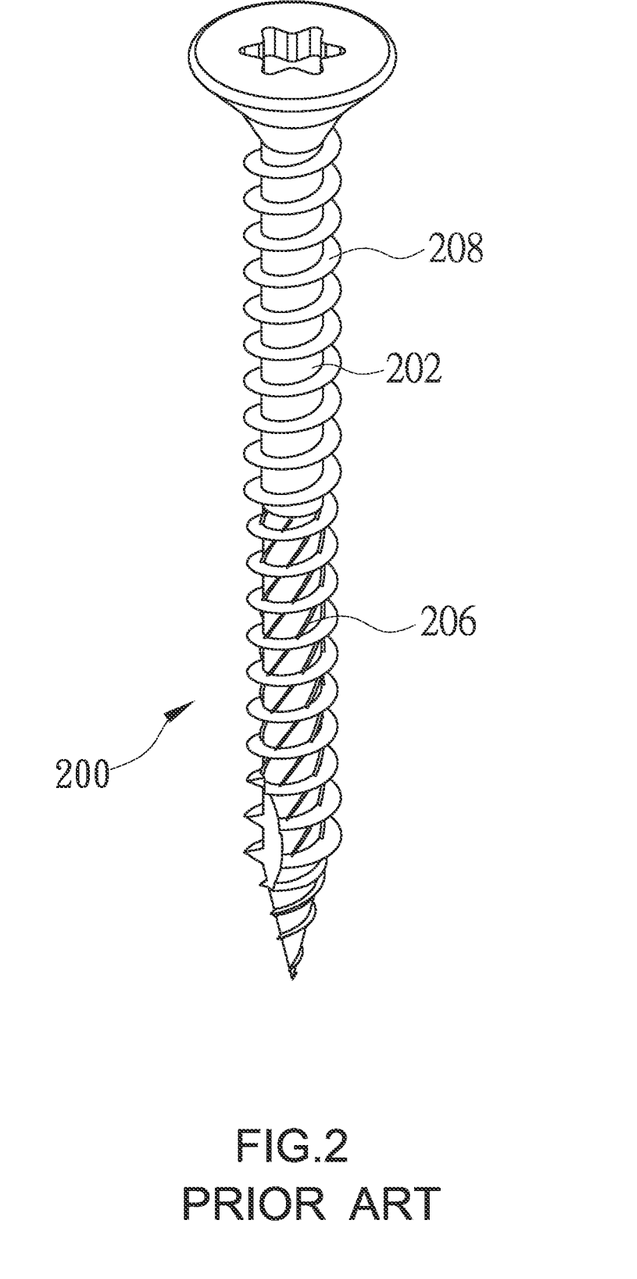
FIG. 2 is a schematic view of another traditional wood screw.
Figure 3:
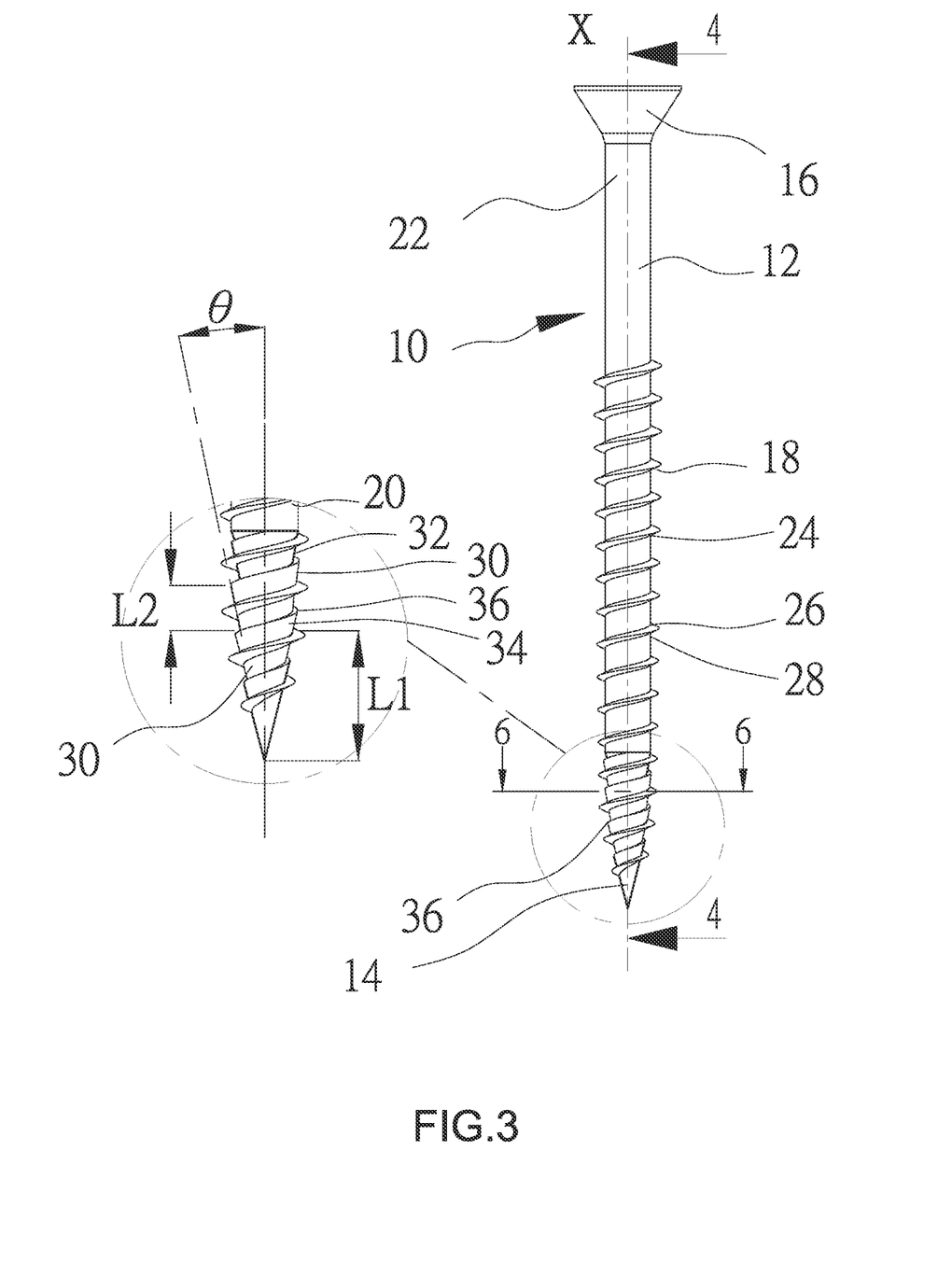
FIG. 3 shows a schematic view and a partial, enlarged view of a screw in accordance with a first embodiment of the present invention.
Figure 4:
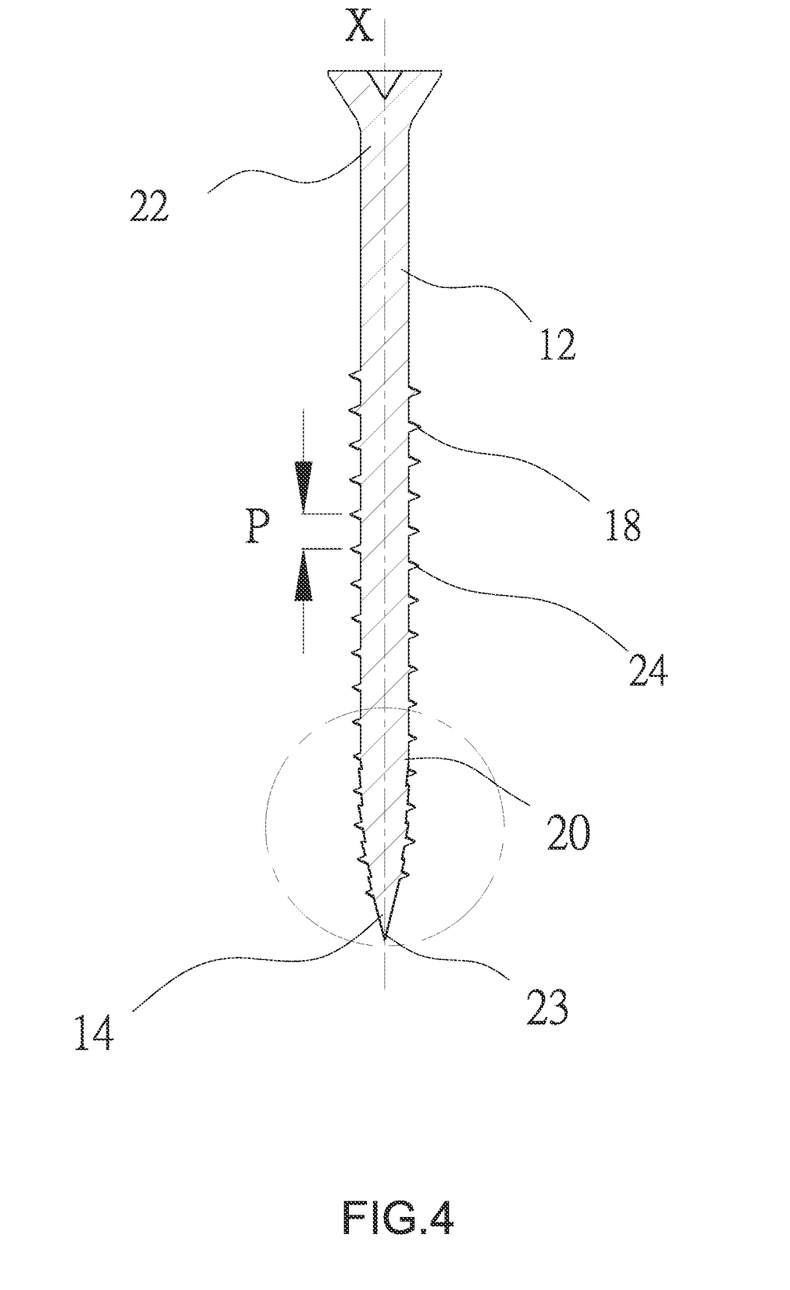
FIG. 4 is a sectional view taken along line 4-4 of FIG. 3.
Figure 5:
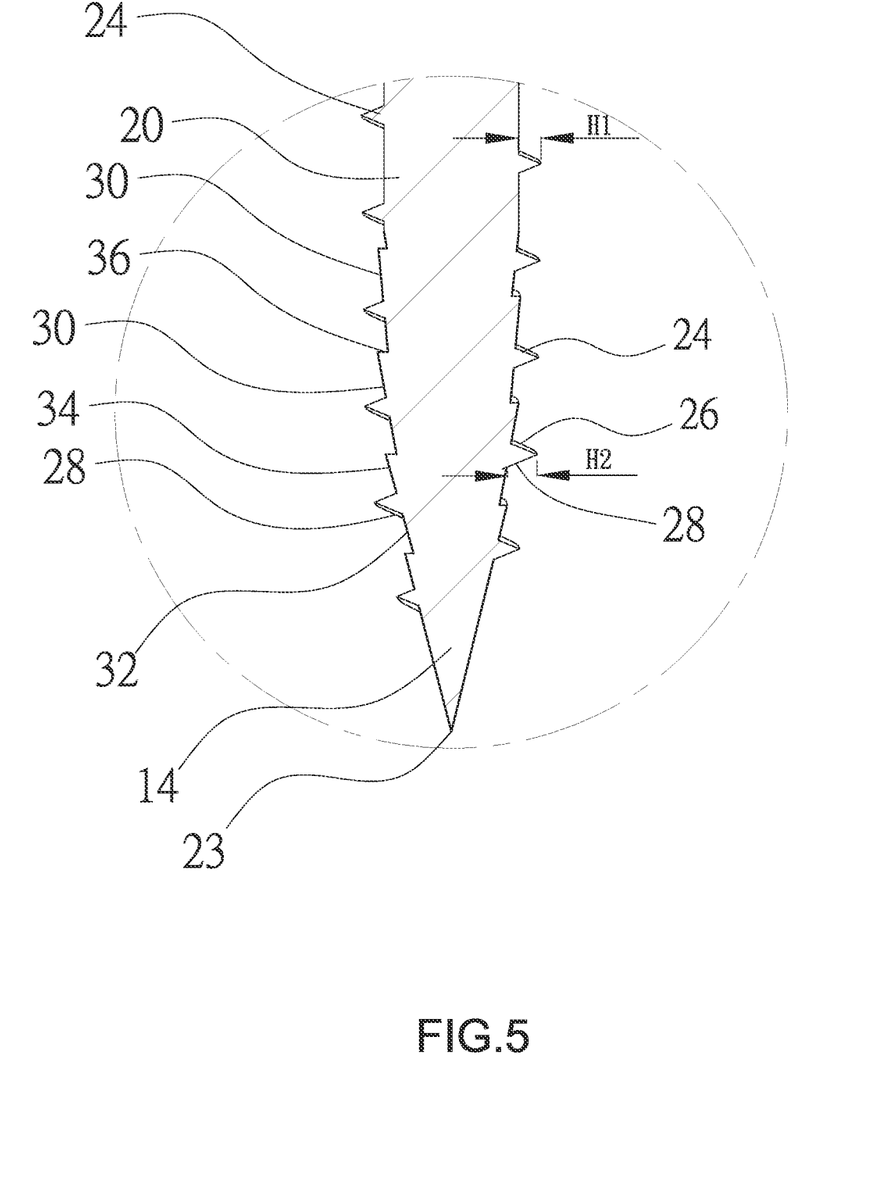
FIG. 5 shows an enlarged view of a circled portion of FIG. 4.
Figure 6:
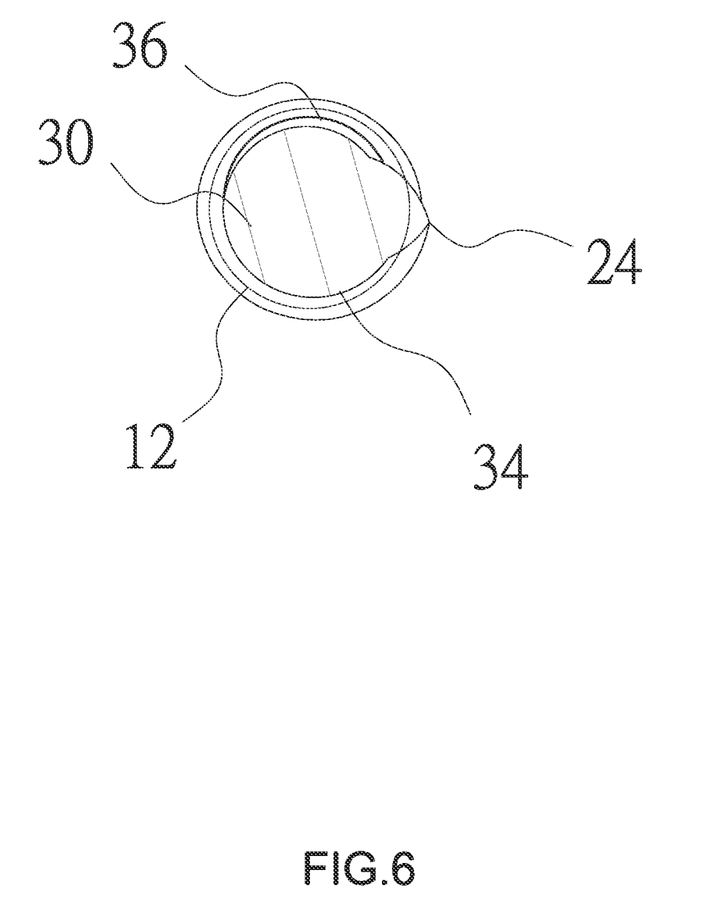
FIG. 6 is a sectional view taken along line 6-6 of FIG. 3.

In addition, a wood screw 200, as shown in FIG. 2, is provided with a cutting unit 206 on a shank 202 with which a hole is reamed effectively and the shank 202 of the screw 200 is driven into a workpiece easily. However, the cutting unit 206, which consists of a plurality of slantwise ribs protruding from the shank 202, makes the depth of the thread convolution of a thread 208 embedded into the workpiece shallow, weakening anti-pullout strength of the thread 208. Furthermore, in the case of any external stress applied (for example, strong breeze and earthquake), a screw having insufficient bite force to the workpiece is probably pulled out by the external force. Accordingly, building regulations in various countries require that screws used in building structures should be tested for the characteristic withdrawal parameter. However, traditional wood screws may fall short of an adequate anti-pullout force because traditional wood screws only rely on the resultant force based on force components generated in the direction of the external force by upper tooth surfaces of the thread facing the head of the wood screw to resist the pullout force. Moreover, the thread height at the screw-in portion with a pointed shape is much lower than the thread height of the shank of the screw, so that the screw-in part only contributes a small part to the overall anti-pullout strength.

A wood screw disclosed in U.S. Pat. No. 10,480,560 includes tapered portions extending toward a screw tip between two thread turns of a thread. When the wood screw is being driven into a wood base, the tapered portions extending toward the screw tip shove and compress wood materials in the radial direction for increment of the anchoring force. However, the tapered portions make the lower tooth surface height of the thread turn shallow (lower) that weakens the traction force of the thread turns biting the workpiece but raises the screw-in friction which should be overcome by a higher output torque from a power tool.

BRIEF SUMMARY OF THE INVENTION

Thus, an objective of the present invention is to provide an anti-pullout and low-resistance screw on which at least one thread convolution has a raised lower tooth surface height for higher traction of the thread convolution to bite a workpiece such that a shank of the screw can be driven into the workpiece effectively and driving resistance is reduced. Moreover, the screw is designed to form at least one anti-pullout plane on the shank between two thread convolutions for escalating anti-pullout strength of the screw.

To achieve this and other objectives, a screw of the present invention includes a shank, a screw-in portion, a head portion, a thread, and at least one tapered pressing structure. The shank defines a longitudinal axis and includes front and rear segments spaced from each other along the longitudinal axis. The screw-in portion is formed at the front segment of the shank, and the head portion is formed at the rear segment of the shank. The thread is helically formed around both the screw-in portion and the shank and includes a plurality of thread convolutions. The thread convolution has a thread height and includes an upper tooth surface facing the head portion and a lower tooth surface facing the screw-in portion. The at least one tapered pressing structure is designed on the screw-in portion and/or the shank to define at least one section having an outer diameter tapering towards the screw-in portion gradually. The tapered pressing structure extends at a bottom edge of the lower tooth surface of a corresponding thread convolution along the longitudinal axis, and the lower tooth surface of the corresponding thread convolution has a lower tooth surface height that is greater than the thread height of the thread convolution around which no tapered pressing structure is designed.

In a preferred form, the screw-in portion and the shank are provided with a plurality of tapered pressing structures which helically extend at the lower tooth surfaces of a plurality of consecutive thread convolutions along the longitudinal axis, and an annular anti-pullout plane is formed at an upper end of each tapered pressing structure.

In a preferred form, a pitch is defined between two adjacent thread convolutions, and each tapered pressing structure has an axial extension length in a direction of the longitudinal axis which is 20-150% of the pitch.

In a preferred form, a tilt angle of the tapered pressing structures relative to the longitudinal axis is in the range of 10-30 degrees.

In a preferred form, each tapered pressing structure includes a minor longitudinal segment extending towards the screw-in portion from the bottom edge of the lower tooth surface of the corresponding thread convolution and a major longitudinal segment extending towards the head portion from a bottom edge of the upper tooth surface of the corresponding thread convolution.

In a preferred form, the bottom edge of the lower tooth surface of each thread convolution on the shank is provided with one tapered pressing structure to define a plurality of sections whose outer diameters taper towards the screw-in portion gradually, and an annular anti-pullout plane is formed between any two adjacent convolutions on the shank.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

A screw according to a first embodiment of the present invention is shown in FIGS. 3 through 6 of the drawings and generally designated 10. The screw 10 includes a shank 12, a screw-in portion 14, a head portion 16, and a thread 18. The shank 12 has substantially the same shank diameter and defines a longitudinal axis X. The shank 12 includes front and rear segments 20 and 22 spaced from each other along the longitudinal axis X. The screw-in portion 14 integrally links the front segment 20 of the shank 12, and the head portion 16 forms at the rear segment 22 of the shank 12. The screw-in portion 14 has a tapered section with a tip 23 and has a length L1 in the direction of the longitudinal axis X. The thread 18 is helically formed around both the screw-in portion 14 and the shank 12 and extends to the middle segment or the rear segment 22 of the shank 12 from the screw-in portion 14. The thread 18 includes a plurality of thread convolutions 24, and each thread convolution 24 has a thread height H1 (that is, the distance between the crest and the root of the thread 18, normal to the longitudinal axis X). A pitch P is defined between two adjacent thread convolutions 24, and the screw-in portion length L1 is generally greater than the pitch P Each thread convolution 24 has an upper tooth surface 26 facing the head portion 16 and a lower tooth surface 28 facing the screw-in portion 14.

The screw 10 of the present invention is characterized in that the screw-in portion 14 and/or the shank 12 is provided with at least one tapered (conical) pressing structure 30 to define at least one section having an outer diameter tapering in the direction from the head portion 16 to the screw-in portion 14 gradually (that is, expanding from the screw-in portion 14 to the head portion 16 gradually). In this embodiment, each tapered pressing structure 30 extends from the bottom edge of the lower tooth surface 28 of one of the thread convolutions 24 towards both sides along the longitudinal axis X such that the lower tooth surface 28 of the thread convolution 24 has a lower tooth surface height (radial concave depth) H2 that is the distance between the crest of the thread convolution 24 and the lower tooth surface 28 of the thread convolution 24, normal to the longitudinal axis X. The lower tooth surface height H2 is greater than the thread height H1 of the thread convolution 24 around which no tapered pressing structure 30 is designed. In this embodiment, three tapered pressing structures 30 are provided on the outer periphery of both the screw-in portion 14 and the front segment 20 of the shank 12. Each tapered pressing structure 30 has an axial extension length L2 in the direction of the longitudinal axis X, and the axial extension length L2 is preferably 20-150% of the pitch P, which can maintain the best thread traction and improve the overall anti-pullout strength of the screw 10.

The tapered pressing structure 30 features the outer diameter thereof that gradually decreases towards the screw-in portion 14 and gradually expands towards the head portion 16. In this embodiment, each tapered pressing structure 30 includes a minor longitudinal segment 32 extending toward the screw-in portion 14 from the bottom edge of the lower tooth surface 28 of a corresponding thread convolution 24 and a major longitudinal segment 34 extending towards the head portion 16 from the bottom edge of the upper tooth surface 26 of the corresponding thread convolution 24. There is an annular anti-pullout plane 36 formed at an upper end of each tapered pressing structures 30. Specifically, the minor longitudinal segment 32 of one tapered pressing structure 30 and the major longitudinal segment 34 of another tapered pressing structure 30 connected to a lower end of the minor longitudinal segment 32 are provided between two adjacent thread convolutions 24. The annular anti-pullout plane 36 is formed by the interface between the upper end of the major longitudinal segment 34 and the lower end of the minor longitudinal segment 32. Furthermore, a tilt angle (that is, half taper angle) θ relative to the longitudinal axis X is defined along the outer periphery of the tapered pressing structures 30 and has direct effects on the radial concave depth of the lower tooth surface 28 and the expansion degree of the anti-pullout plane 36, both of which further influence traction force and anti-pullout strength of the thread convolutions 24. In this embodiment, the tilt angle θ of the tapered pressing structures 30 relative to the longitudinal axis X is approximately equal to a tilt angle of the screw-in portion 14 relative to the longitudinal axis X. In a feasible embodiment, the tapered pressing structures 30 provided on both the screw-in portion 14 and the shank 12 may have the same or different tilt angles θ with respect to the longitudinal axis X, and the best mechanical performance can be achieved when the tilt angles θ is in the range of 10-30 degrees.

In practice, the screw 10 of the present invention is screwed into a workpiece 38 such as a wood plank by the screw-in portion 14 (FIG. 7), The workpiece 38 contacting the thread 18 is cut by the lower tooth surfaces 28 of the thread convolutions 24 in the course of the screw-in portion 14 of the screw 10 driven into the workpiece 38. With the thread convolutions 24 on the screw-in portion 14 and/or the front segment 20 of the shank 12 having a larger lower tooth surface height H2, when the screw-in portion 14 of the screw 10 is screwed into the workpiece 38, the thread convolutions 24 exert strong traction force to pull the linked shank 12 into the workpiece 38 effectively. Moreover, the annular anti-pullout plane 36 additionally formed on each tapered pressing structure 30 and between two adjacent thread convolutions 24 on the shank 12 escalates the anti-pullout strength of the screw (as shown in the arrow in FIG. 7) when the screw 10 is driven into the workpiece 38.

Figure 7:
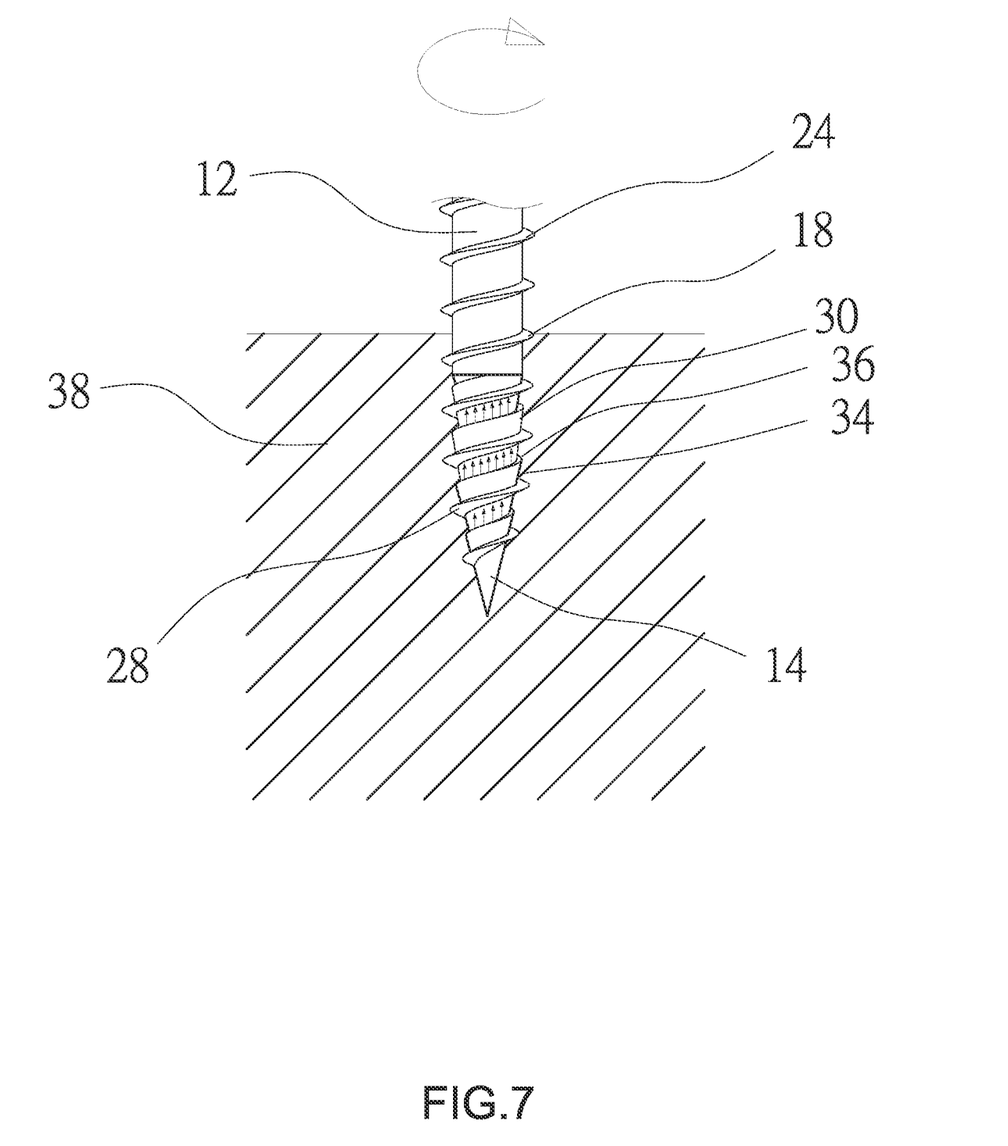
FIG. 7 is a schematic view which illustrates the screw in FIG. 3 is being driven into a workpiece.

In this embodiment, the minor longitudinal segments 32 of the tapered pressing structures 30 helically extend on the lower tooth surfaces 28 of consecutive thread convolutions 24 on the screw-in portion 14 and the shank 12 along the longitudinal axis X. Accordingly, in the process of screwing the screw 10 into the workpiece 38, the outer diameter of the tapered pressing structure 30 gradually converges towards the screw-in portion 14, which can exert less radial tension on the workpiece 38 during the screwing process to further reduce the driving resistance and prevent the workpiece from cracking due to extrusion. In a feasible embodiment, the plurality of tapered pressing structures 30 may have the same or different axial extension lengths L2. Furthermore, the tapered pressing structures 30 on both the screw-in portion 14 and the shank 12 are not limited to consecutive tapered pressing structures, for example, may be composed of several discontinuous tapered pressing structures.

Figure 8:
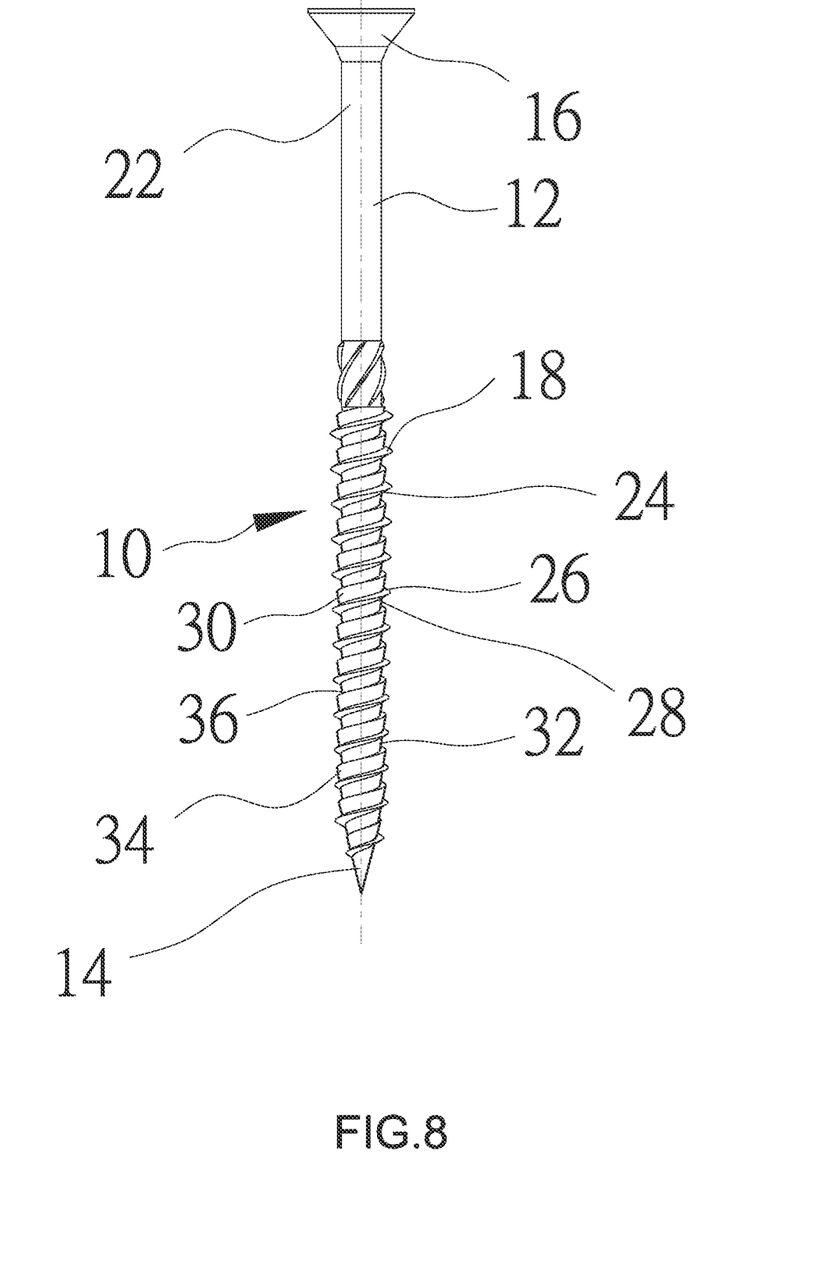
FIG. 8 is a schematic view of a screw in accordance with a second embodiment of the present invention.

FIG. 8 illustrates a screw 10 in a second embodiment of the present invention. In this embodiment, the bottom edge of the lower tooth surface 28 of each thread convolution 24 on the shank 12 is provided with a tapered pressing structure 30 to define a plurality of sections whose outer diameters taper in the direction from the head portion 16 towards the screw-in portion 14 gradually (expand from the screw-in portion 14 toward the head portion 16 gradually). Furthermore, a major longitudinal segment 34 is provided between any two adjacent thread convolutions 24, so that the number of the anti-pullout planes 36 formed on the shank 12 increase.

Figure 9:
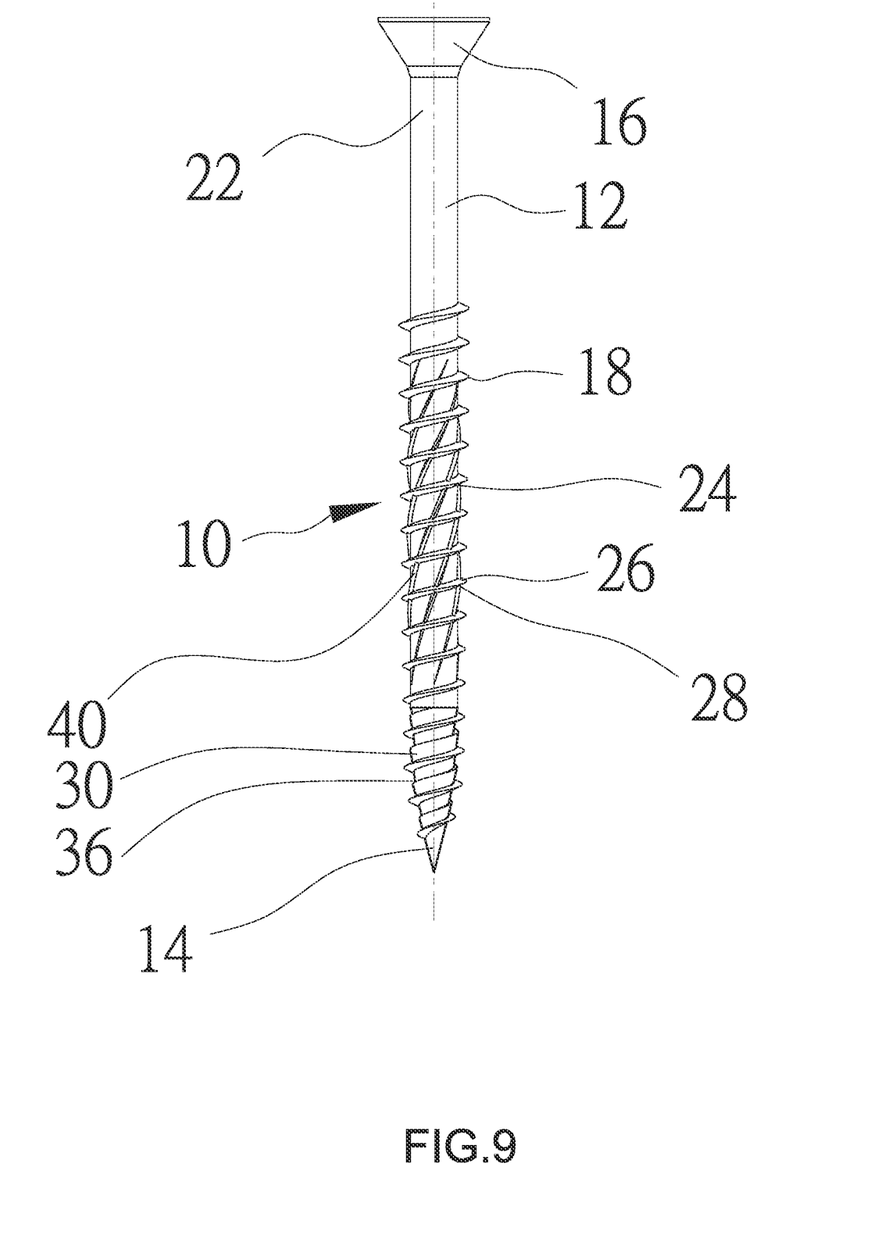
FIG. 9 is a schematic view of a screw in accordance with a third embodiment of the present invention.

FIG. 9 illustrates a screw 10 in a third embodiment of the present invention. In this embodiment, the screw 10 further includes a plurality of slantwise ribs 40 designed on the outer periphery of the shank 12 and between two adjacent thread convolutions 24 for better removal of debris, so that the shank 12 can be easily screwed into the workpiece, and the arrangement of the tapered pressing structures 30 can improve the overall anchoring force.

Figure 10:
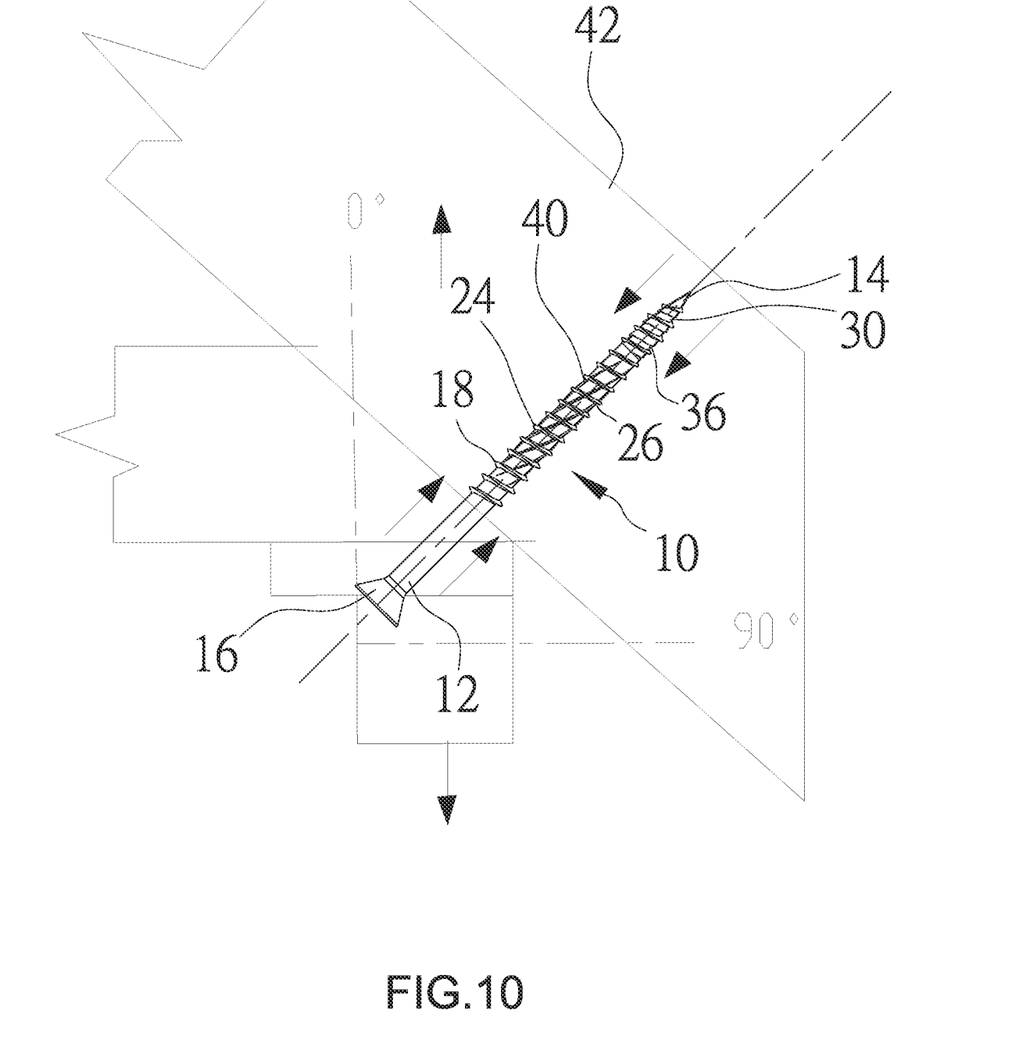
FIG. 10 is a schematic view which illustrates the screw in FIG. 9 has been driven into a building structure.

FIG. 10 illustrates that after the screw 10 of the present invention is locked into a building structure 42, except for the resultant force based on component forces generated in the direction of the external force by the upper tooth surfaces 26 of the thread convolutions 24 on the side of the head portion 16 to resist the pullout force, utilizing the lower tooth surface height of the thread convolutions 24 on the side of the screw-in portion 14 to be deeper than the screw height of the shank 12 and utilizing the anti-pullout planes 36 formed on the shank 12, the overall anti-pullout strength of the screw 10 is effectively improved.

In the above embodiments, the screw 10 includes a single thread 18. In a feasible embodiment, the screw 10 of the present invention may include multiple threads, for example, two threads with high thread convolutions and low thread convolutions, respectively. For an application of the screw 10 with multiple threads, the tapered pressing structures 30 can be designed on the lower tooth surface of thread convolutions of a single thread or on the lower tooth surfaces of thread convolutions 24 of the multiple threads to increase the traction force of the thread convolutions biting into the workpiece and increase the anti-pullout strength of the screw 10.

The scope of the invention is to be indicated by the appended claims, rather than by the foregoing description, and all changes which come within the meaning and range of equivalency of the claims are intended to be embraced therein.

The invention claimed is:

1. An anti-pullout and low-resistance screw comprising:
a shank defining a longitudinal axis and including front and rear segments spaced from each other along the longitudinal axis;
a screw-in portion formed at the front segment of the shank;
a head portion formed at the rear segment of the shank;
a thread helically formed around both the screw-in portion and the shank and including a plurality of thread convolutions, with each of the plurality of thread convolutions having a thread height and including an upper tooth surface facing the head portion and a lower tooth surface facing the screw-in portion; and
at least one tapered pressing structure designed on the screw-in portion and/or the shank to define at least one section having an outer diameter tapering towards the screw-in portion gradually, with the at least one tapered pressing structure extending from a bottom edge of the lower tooth surface of a corresponding thread convolution along the longitudinal axis, wherein the lower tooth surface of the corresponding thread convolution has a lower tooth surface height of a distance between the crest and the root of the thread convolution, that is greater than the thread height of a distance between the crest and root of the thread convolution around which no tapered pressing structure is designed, wherein the at least one tapered pressing structure has an upper end formed with an annular anti-pullout plane.

2. The screw according to in claim 1, wherein a plurality of tapered pressing structures are provided on the screw-in portion and the shank and helically extend at the lower tooth surfaces of a plurality of consecutive thread convolutions along the longitudinal axis.

3. The screw according to claim 1, wherein a pitch is defined between two adjacent thread convolutions, the tapered pressing structure has an axial extension length in a direction of the longitudinal axis, and the axial extension length is 20-150% of the pitch.

4. The screw according to claim 1, wherein a tilt angle of the tapered pressing structures relative to the longitudinal axis is in the range of 10-30 degrees.

5. The screw according to claim 2, wherein each tapered pressing structure includes a minor longitudinal segment extending towards the screw-in portion from the bottom edge of the lower tooth surface of the corresponding thread convolution and a major longitudinal segment extending towards the head portion from a bottom edge of the upper tooth surface of the corresponding thread convolution.

6. The screw according to claim 1, wherein the bottom edge of the lower tooth surface of each thread convolution on the shank is provided with one tapered pressing structure to define a plurality of sections whose outer diameters taper toward the screw-in portion gradually, and the annular anti-pullout plane is formed between any two adjacent convolutions on the shank.

* * * * *